Patented Oct. 26, 1954

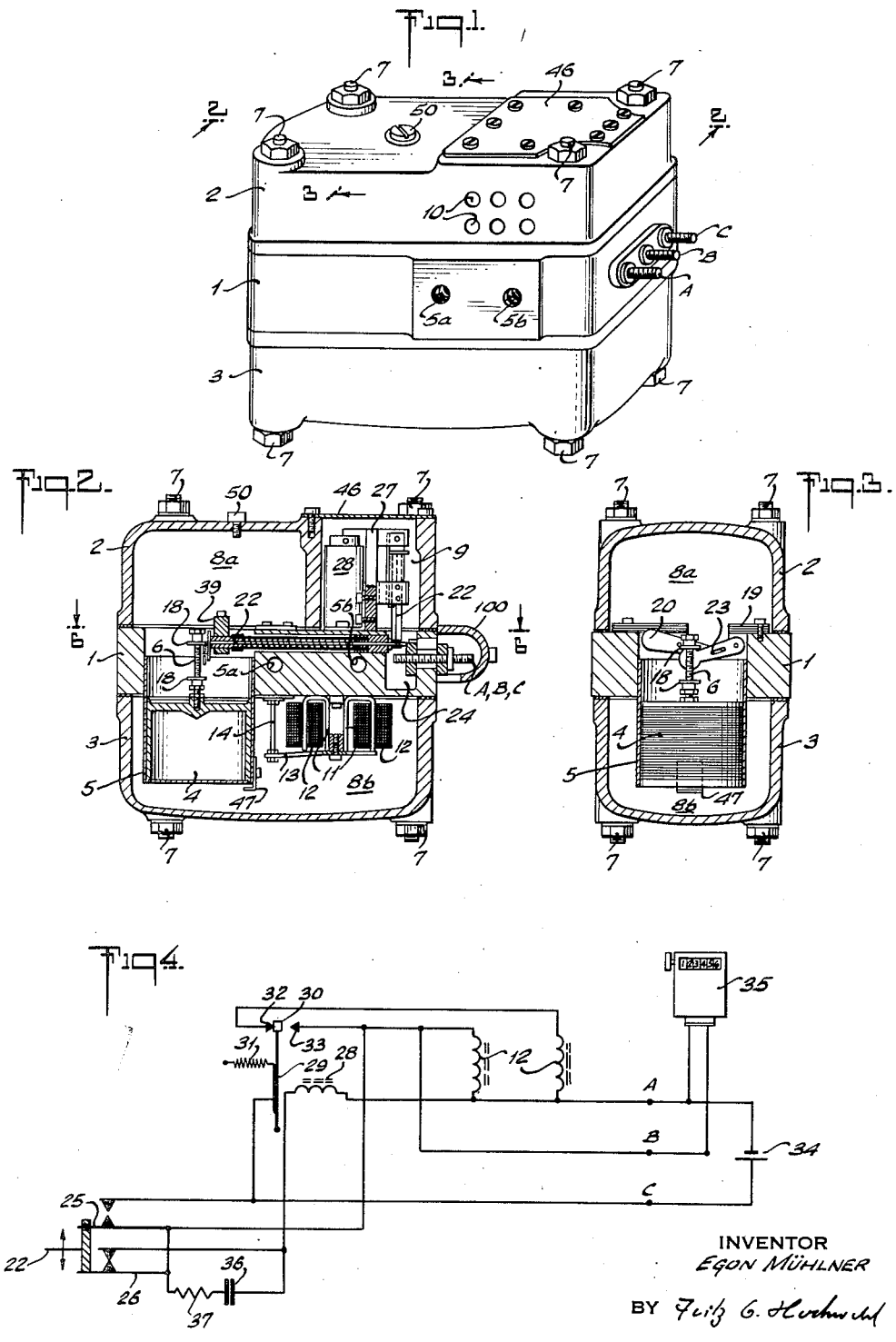

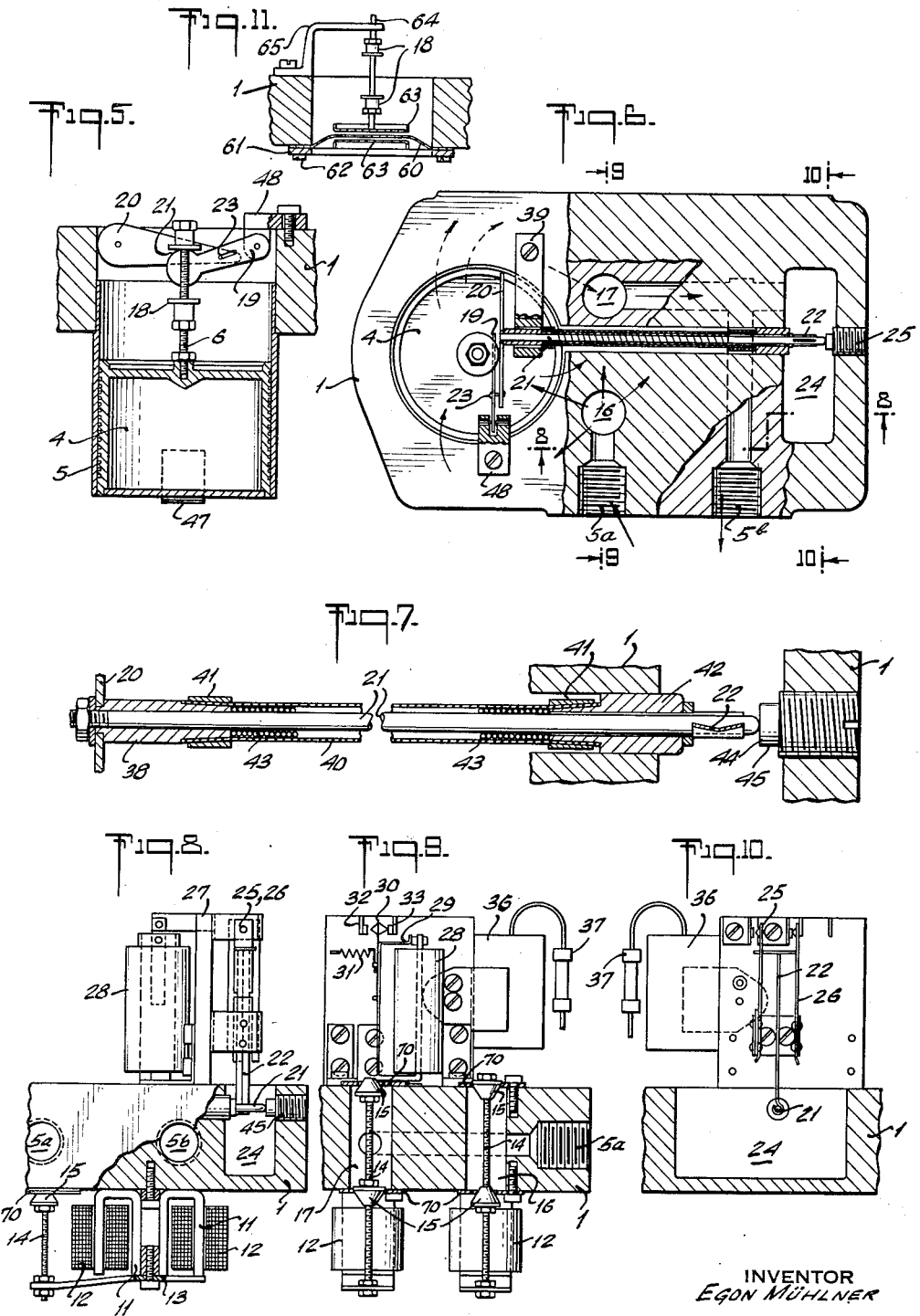

2,692,500

UNITED STATES PATENT OFFICE 2,692,500

FLUID METER

Egon Mühlner, Braunschweig, Germany

Application March 11, 1952, Serial No. 275,960

9 Claims. (Cl. 73—250)

1

The invention relates to volumetric fluid meters, which are particularly suitable for measuring small volumes of liquid fuels. Such fluid meters are used, for instance, in connection with oil burners and especially for the measurement of the fuel consumption in internal combustion engines and vehicles for testing and control purposes.

The device of the invention is a fluid meter, where a piston, diaphragm or other reciprocable or oscillatable member is impinged on both sides by the liquid and where, for instance, the number of piston strokes is a measure of the total volume of the metered liquids. The movement of the liquid, and, consequently, the movement of the measuring member is reversed by electrically actuated valves, whereby the member itself controls the reversal by means of electrical contacts actuated at the end of its stroke. The electrical contacts control a relay which actuates, on the one hand, magnets operating the valves, and, on the other hand, an electric telecounter, which counts, for instance, the piston strokes or can be calibrated directly in volumetrical units.

A principal object of the invention is to provide a device of the character described, where the electric contacts are so arranged as to remain in clean and operative condition.

Another object of the invention is to provide an arrangement of the counter gear which prevents any contact of the gear with the metered liquid.

Still another object of the invention is to provide means which transmit the reciprocating movement of the metering member to the counter gear only when said movement is reversed, whereas at all other times the metering member is disconnected from the counter gear and is subjected only to the impact of the metered liquid.

Other objects and advantages will be apparent from a consideration of the specification and claims.

For a better understanding of the invention, reference may be had to the accompanying drawings, in which a preferred embodiment of the invention is shown, and in which Fig. 1 is a perspective view of an assembled single piston fluid meter according to the invention;

Fig. 2 is a vertical longitudinal section of the device taken along lines 2—2 of Fig. 1;

Fig. 3 is a vertical cross section, taken along lines 3—3 of Fig. 1;

Fig. 4 is a schematic circuit diagram;

Fig. 5 is, on an enlarged scale, a sectional view similar to that shown in Fig. 3 and showing also the piston in section;

Fig. 6 is a horizontal section taken on line 6—6 of Fig. 2;

Fig. 7 shows, on an enlarged scale, details of Fig. 6 to illustrate the means which prevent the access of the metered liquid to the electric contacts; and Figs. 8 to 10 are sections taken on lines 8—8, 9—9, and 10—10 of Fig. 6 respectively, and show details of the electromagnetic operation of the valves and counter.

Fig. 11 shows another embodiment of the invention where instead of a piston a diaphragm is used as the metering member.

Referring to Fig. 1 of the drawings, the reference numeral 1 designates the central part of the housing, and 2 and 3 the top and bottom sections, respectively. The electrical conduits to the battery and telecounter are connected to the terminals A, B, C. These terminals may be protected by a cap 100. Numeral 5a denotes the admission and 5b the exit for the metered liquid. The sections 1, 2, and 3, are screwed together by bolts 6 and nuts 7 and are tightly pressed together along their plane faces with interposition of a suitable packing. The hollow piston 4 is driven by the metered liquid and reciprocates in a bushing 5.

Said bushing 5 connects two closed chambers 8a and 8b, through which the liquid being measured passes and which are filled therewith. The chamber 8b is enclosed by the bottom section 3 of the housing, and the chamber 8a is arranged in the top section 1. The top section 1 contains, in addition, a chamber 9 which communicates with the atmosphere through openings 10 and is closed on top by a detachable lid 46. Chamber 9 contains a relay and the switch mechanism, which will be explained in detail hereinbelow. The bottom section 3 contains two magnetically operated double valves, which are located within the liquid and shown lying one behind the other in Fig. 8. A double U-shaped iron core 11 is provided with two windings 12. The armature 13 is bent in such a way as to be capable of being attracted either by the left or right coil and is pivotally supported at the bend. One arm of the armature is prolonged and carries the valve rod 14, and thereon two valve cones 15, of which there are four in all (Fig. 9). By raising and lowering the valve rods and cones, the apertures 16 and 17, which are provided with valve seats in the form of annular discs 70, are opened and closed (see also Fig. 6). The aperture 16 communicates with inlet 5a; the aperture 17 communicates with the outlet 5b, offering to the liquid a bent path.

Fig. 6 illustrates the movement of the liquid. Assuming a position of the valves so as to open the aperture 16, the liquid passes, as indicated by the arrows in full lines, upwardly through the aperture 16 and impinges on the upper side of the piston, thereby also filling out the chamber 8a. The liquid forces the piston downwardly until it reaches the lowest position. A stop 47 is provided to prevent the piston from falling out of the cylinder 5. The liquid trapped under the piston in the bottom section 3 passes through the opened aperture 17 and the bent channel, and leaves the device at exit 5b. In the lowermost position, the piston reverses in a manner described herein later, the valve magnets, whereupon the path of the liquid is reversed; the liquid flows out of the lower aperture 16, enters into the upper apertures, and leaves the device again through the exit 5b.

On viewing again Fig. 2, it will be noted that the piston rod 6 is provided with two lugs or collars 18 actuating by means of levers 19 and 20 (Figs. 5 and 6) a shaft 21.

Lever 19 is, for instance, pivotally supported in a slotted bracket 48 secured to the housing (Fig. 6). Lever 20 is secured to the shaft 21 and engages with a pin 23 a slot of lever 19. In the end positions of the piston, said lugs or collars 18 swing the lever 19 somewhat upwardly or downwardly, respectively, which movement is converted over pin 23 and lever 20 into a slight rotary movement of the shaft 21. This shaft 21 extends into a chamber 24, located in the central block of the housing, as seen in Figs. 2, 6, 8, and 10. This chamber 24 is free of liquid and communicates with the control chamber 9, which contains the electrical switches (Fig. 10).

In the chamber 24, the shaft 21 carries a lever 22. The movement imparted by the displacement of the lever 19 to the shaft 21 is finally transmitted as an oscillating movement to said lever 22, the upper end of which actuates contacts 25 and 26, of which the contact 25 supplies current to the winding of the relay 28, whereas contact 26 interrupts said current. It will be noted that, in this way, mechanical connection between the metering member and the counter gear is established only at the time when the metering member reverses its direction of movement.

The chamber 9 contains further (Fig. 2) a relay 28 secured to an insulating support 27; this relay is also shown in the circuit diagram of Fig. 4 and in Figs. 8 and 9. As seen in Figs. 4 and 9, the armature 29 of the relay carries a contact tongue 30. When the relay is without current, the tongue 30 is pressed, by means of a spring 31, against the rest contact 32; when the relay is traversed by a current, the tongue 30 is pressed against the contact 33.

The two pairs of magnet coils 12 for operating the valves are connected in parallel. As seen from the wiring diagram of Fig. 4, in either of the two possible positions of the relay armature 29, always one or the other group of the magnets operating the valves is switched in. 34 is a source of electric current and 35 is an electromagnetic telecounter, which is switched in by the contact 25 and the relay contact 33. The relay 33 is a holding relay which is actuated by the contact 25 and holds even though the contact at 25 is interrupted. The relay is released only when also the contact between 22 and 26 is interrupted.

In this way, the telecounter 35 is always operatively engaged during a stroke of the piston in one direction and disengaged during the following stroke in the reverse direction, while for each stroke of the piston the corresponding group of valves is switched in. The contact between 22 and 26 is provided with spark extinguishing means, e. g. a condenser 36 and a resistance 37 (Figs. 9 and 10).

In order to ensure a good operation of the device, it is necessary to arrange and to seal off the shaft 21 so as to prevent any access of the metered liquid to the chambers 24 and 9 without impairing the ready response and rotatability of said shaft even though the liquid may be under overpressure.

A preferred embodiment of a fluid-tight seal for the shaft 21 is illustrated in Fig. 7, where also the lever 20 is shown, which receives its movement from the lugs 18 of the piston rod over the lever 19 and the pin 23. The shaft 21 is, at one end, keyed to a sleeve 38, which is supported for free rotation in a bearing 39 (Fig. 6), and near the other end supported for free rotation with sufficient play in a bushing 42, which is fastened in the center block 1 of the housing. The sleeve 38 and bushing 42 are conically tapered towards each other so as to receive the two ends of a hose 40, which is fastened by rings 41. This hose prevents any leakage of fluid along the shaft 21 into the chambers 24 and 9.

When the shaft 21 receives a slight rotary movement from the piston rod, the hose 40 will be twisted as its left end is attached to a rotatable member and its right end to a stationary member. A wire coil 43, or other suitable spacing means, such as balls or the like, is inserted in the hose 40 around shaft 21 in order to avoid that the hose is flattened against the shaft by the pressure of the liquid and disturbs the free rotatability of shaft 21.

The axial thrust of the shaft 21 is taken up by the flat surface 44 of a screw 45 inserted in the wall of the housing.

The device operates as follows: if, e. g., the fuel consumption of an internal combustion engine is to be measured, the device is, by means of the connections 5a and 5b, inserted in the fuel feed line of the engine. In order to obtain exact measurements, the device should first be deaerated by removing the deaerating screw 50 on top of the housing to expose a deaerating opening (Fig. 1). As soon as fuel appears at this opening, it is closed by reinserting the screw 50. The device is now ready for operation after the terminals A, B, and C have been connected with a source of electric current and the counter 35, as indicated in Fig. 4. The liquid passing through the device will produce a number of piston strokes corresponding to its quantity. These piston strokes transmit, in the manner described, movements into the switch chamber so as to operate the valves 15 and the counter 35.

Instead of employing a piston as the metering member, I can also use a diaphragm as shown in Fig. 11, which is otherwise similar to Fig. 5. Here, the piston 4 is replaced by a diaphragm 60, which is supported, for instance, by means of a ring 61 secured by screws 62 to the part 1 of the housing. On both sides of the diaphragm, discs 63 are arranged in known manner, to which a rod 64 is attached corresponding to the piston rod 6. Said rod 64 is provided with lugs or collars 18, which convert the reciprocating movement of the rod 64 by means of levers 19 and 20 into a rotary movement of shaft 21, in the manner described hereinabove. The rod 64 is somewhat longer than the piston rod 6 to ensure the straight movement of the same by means of a guiding bracket 65 secured to the housing 1.

Other metering members, for instance bellows, may be used in similar manner.

Though I have described only single piston or membrane fluid meters according to the invention, it will be obvious that the new features of the invention can be applied also to devices using several metering members. It will be understood that various changes in the details of construction and in the combination and arrangement of parts may be resorted to which fall within the scope of the invention as claimed.

What I claim is:

1. A fluid meter of the character described, comprising a housing forming two chambers for passage of fluid to be metered and a switch chamber sealed off from said fluid filled chambers, a measuring cylinder connecting said two fluid filled chambers, said two chambers and cylinder forming a fluid filled space, an actuating member in said cylinder reciprocable by the fluid therein, electromagnetically operated valves to direct the fluid alternately onto the one and the other side of said actuating member, terminals for a source of electrical current and a counter, respectively, a shaft freely rotatable in said housing and extending from the fluid filled space into said switch chamber, a lever mechanism operatively connecting said actuating member and said shaft and transforming the reciprocatory movement of the actuating member into rocking movement of the shaft about its axis, electrical contacts in said switch chamber controlling said valves and counter, means secured to said shaft in the switch chamber for operating the electrical contacts as a function of the rocking movement of the shaft, and an electric circuit interconnecting said contacts, terminals, valves, and counter.

2. A fluid meter as defined in claim 1, wherein said switch chamber communicates with the atmosphere.

3. A fluid meter of the character described, comprising a housing consisting of a top section, a middle section, and a bottom section, said top section and said bottom section each forming a chamber for passage of fluid to be metered, a measuring cylinder in said middle section connecting said two fluid filled chambers, said chambers and cylinder forming a fluid filled space, an actuating member in said cylinder reciprocable by the fluid therein, electromagnetically operated valves to direct the fluid alternately onto the one and the other side of said actuating member, terminals for a source of electrical current and a counter, respectively, said top section forming a switch chamber sealed off from said fluid filled chambers, electrical contacts in said switch chamber controlling said valves and said counter, a shaft freely rotatable in said housing and extending from the fluid filled space into said switch chamber, a lever mechanism operatively connecting said actuating member and said shaft and transforming the reciprocatory movement of the actuating member into rocking movement of the shaft about its axis, means secured to said shaft in the switch chamber for operating the electrical contacts as a function of the rocking movement of the shaft, and an electric circuit interconnecting said contacts, terminals, valves, and counter.

4. A single piston fluid meter of the character described, comprising a housing forming two chambers for passage of fluid to be metered and a switch chamber separated by a wall from said fluid filled chambers, a measuring cylinder connecting said two fluid filled chambers, said two chambers and cylinder forming a fluid filled space, a piston reciprocable by the fluid in said cylinder, electromagnetically operated valves to direct the fluid alternately onto the one and the other side of said piston, terminals for a source of electrical current and a counter, respectively, said separating wall having a bore therein, a bushing in said bore, a freely rotatable shaft extending from the fluid filled space of the housing into said switch chamber, one end of said shaft being supported in said bushing, a bearing within said housing supporting the other end of said shaft, a length of hose closely surrounding said shaft and extending from said bushing in the direction of said fluid filled space, said hose being sealed at one end to said stationary bushing and with its opposite end being rotatable with said shaft in sealed relationship therewith, so as to prevent leakage of fluid along the shaft through the bushing into the switch chamber, means to transform the reciprocating movement of the piston into rocking movement of the shaft about its axis, electrical contacts in said switch chamber, controlling means secured to said shaft in the switch chamber for operating the electrical contacts as a function of the rocking movement of the shaft, and an electric circuit interconnecting said contacts, terminals, valves, and counter.

5. A fluid meter as defined in claim 4, including a thrust bearing for said shaft to receive the axial thrusts exerted on said shaft, said thrust bearing being mounted in a wall of said housing.

6. A fluid meter as defined in claim 4, including means for maintaining the hose in spaced relationship around the shaft.

7. A fluid meter as defined in claim 4, including a coil spring laid around the shaft for supporting the hose against the pressure of the liquid.

8. A single piston fluid meter of the character described, comprising a housing forming two chambers for passage of fluid to be metered and a switch chamber separated by a wall from said fluid filled chambers, said switch chamber communicating with the atmosphere, a measuring cylinder connecting said two fluid filled chambers, said two chambers and cylinder forming a fluid filled space, a piston reciprocable by the fluid in said cylinder, electromagnetically operated valves to direct the fluid alternately onto the one and the other side of said piston, terminals for a source of electrical current and a counter, respectively, said separating wall having a bore therein, a bushing in said bore, a freely rotatable shaft extending from the fluid filled space of the housing into said switch chamber, one end of said shaft being supported in said bushing, a bearing within said housing supporting the other end of said shaft, a sleeve keyed to said other end of the shaft for rotation therewith, a length of hose surrounding said shaft, one end of said hose being sealed to said stationary bushing and the other end of said hose being sealed to said sleeve for rotation therewith so as to prevent leakage of fluid along the shaft through the bushing into the switch chamber, means to transform the reciprocating movement of the piston into rocking movement of the shaft about its axis, electrical contacts in said switch chamber, controlling means secured to said shaft in the switch cham- ber for operating the electrical contacts as a function of the rocking movement of the shaft, and an electric circuit interconnecting said contacts, terminals, valves, and counter.

9. A fluid meter of the character described, comprising a housing forming two chambers for passage of fluid to be metered and a switch chamber sealed off from said fluid filled chambers, a measuring cylinder connecting said two fluid filled chambers, said two chambers and cylinder forming a fluid filled space, a diaphragm in said cylinder reciprocable by the fluid therein, electromagnetically operated valves to direct the fluid alternately onto the one and the other side of said diaphragm, terminals for a source of electrical current and a counter, respectively, a shaft freely rotatable in said housing and extending from the fluid filled space into said switch chamber, a lever mechanism operatively connecting said diaphragm and said shaft and transforming the reciprocatory movement of the diaphragm into rocking movement of the shaft about its axis, electrical contacts in said switch chamber controlling said valves and counter, means secured to said shaft in the switch chamber for operating the electrical contacts as a function of the rocking movement of the shaft, and an electric circuit interconnecting said contacts, terminals, valves, and counter.

References Cited in the file of this patent

UNITED STATES PATENTS

| Number | Name | Date |
|---|---|---|
| 1,470,381 | Lamb | Oct. 9, 1923 |
| 1,932,976 | Lamb et al. | Oct. 31, 1933 |
| 2,014,664 | Nicholls | Sept. 17, 1935 |
| 2,372,813 | Darling | Apr. 3, 1945 |

FOREIGN PATENTS

| Number | Country | Date |
|---|---|---|
| 801,413 | Germany | Jan. 8, 1951 |